ary Examiner—Samuel S. Matthews
United States Patent

Simon et al.

[15] 3,706,265

[45] Dec. 19, 1972

[54] PHOTOGRAPHIC APPARATUS FOR FIRING A PLURALITY OF FLASH LAMPS

[72] Inventors: Horst Simon, 7012 Fellbach near Stuttgart, Schorndorf; Franz Kirpal, 7060 Schorndorf, both of Germany

[73] Assignee: Eastman Kodak Company

[22] Filed: June 1, 1971

[21] Appl. No.: 148,674

[30] Foreign Application Priority Data

June 4, 1970 Germany .................... G 70 20 952.8

[52] U.S. Cl. ........................ 95/11 L, 240/1.3, 431/93
[51] Int. Cl. ............................................. G03b 17/48
[58] Field of Search ................ 95/11 R, 11 L, 11.5 R; 240/1.3, 37.1; 431/93, 95

[56] References Cited

UNITED STATES PATENTS

| 3,584,794 | 6/1971 | Beach | 240/1.3 |
| 3,590,706 | 7/1971 | Millet | 95/11.5 R |
| 3,624,727 | 11/1971 | Horton et al | 95/11.5 R |
| 3,550,514 | 12/1970 | Harvey | 95/11 L |

FOREIGN PATENTS OR APPLICATIONS

| 1,248,459 | 8/1967 | Germany | 95/11 L |

*Primary Examiner*—Samuel S. Matthews
*Assistant Examiner*—Fred L. Braun
*Attorney*—Robert W. Hampton and Leonard W. Treash, Jr.

[57] ABSTRACT

Photographic apparatus for simultaneously firing more than one flash lamp. The apparatus is preferably an adapter receivable by a camera of the type adapted to fire a single mechanically fireable lamp. The adapter has a rotatable socket for receiving a multilamp unit and an actuating mechanism which actuates more than one flash lamp at substantially the same time in response to receipt of mechanical force from the camera flash actuating device. For use with cameras having a rotatable socket, the adapter includes a rotatable socket and a coupling mechanism for rotating the adapter socket 180° in response to rotation of the camera socket through 90°.

7 Claims, 1 Drawing Figure

PATENTED DEC 19 1972
3,706,265
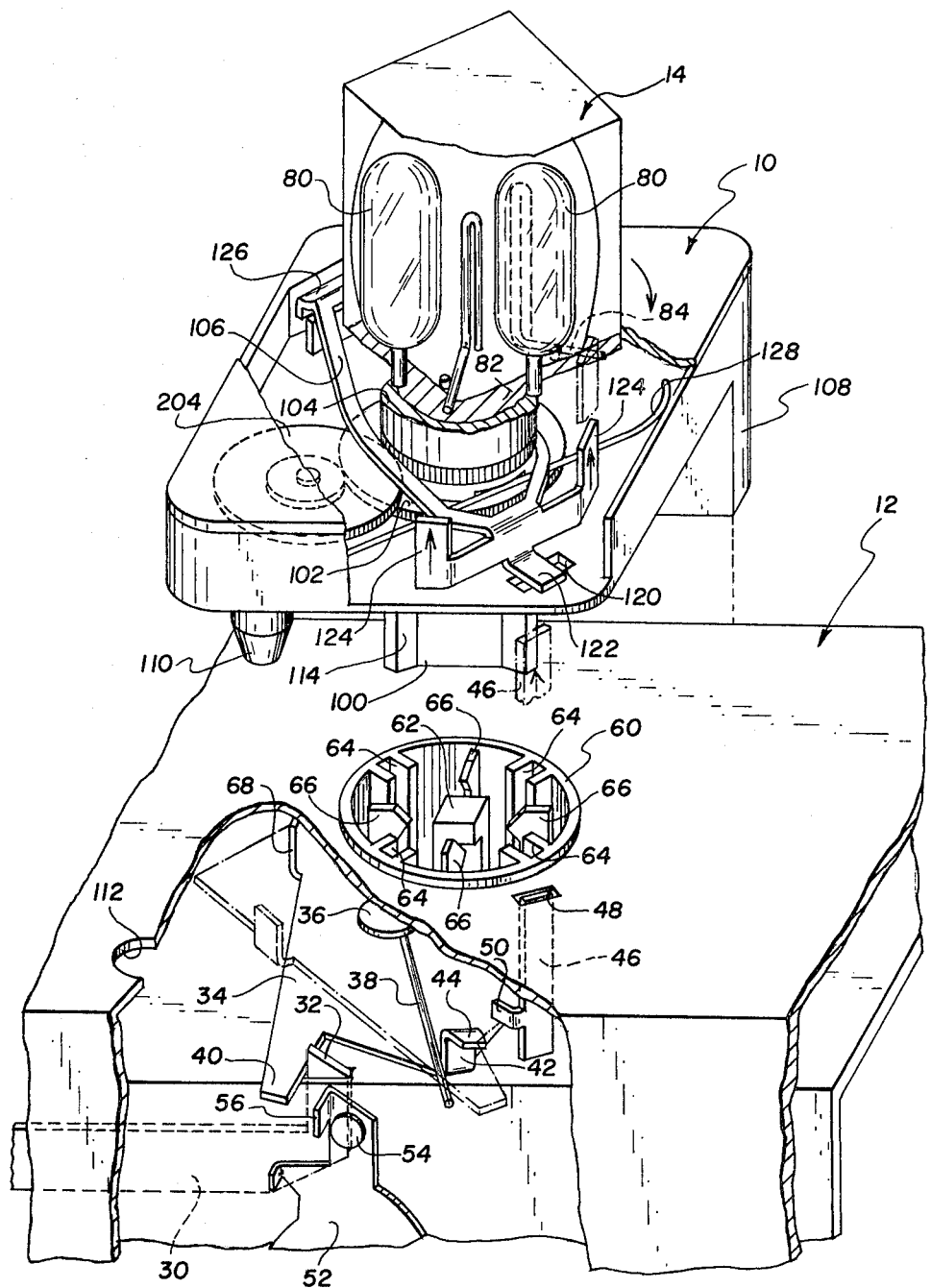
HORST SIMON
FRANZ KIRPAL
INVENTORS
BY Leonard W. Treash, Jr.
W. H. J. Kline
ATTORNEYS

PHOTOGRAPHIC APPARATUS FOR FIRING A PLURALITY OF FLASH LAMPS

BACKGROUND OF THE INVENTION

1. Field of the Invention

The present invention relates generally to photographic flash apparatus and more particularly to flash adapters for firing more than one flash lamp at the same time.

2. Description of the Prior Art

Percussion ignitable flash units have recently been developed in order to obviate certain disadvantages of electrically ignitable photoflash systems; for example, flash failure due to weak batteries or corroded contacts. Such units contain a plurality of self-contained, percussion ignitable flash lamps, each having a lamp envelope enclosing a combustible material and a combustion supporting gas. A metal tube extends from the bottom of the lamp envelope containing a primer charge that is ignitable in response to percussive contact with the tube by a mechanically actuated striking member. To facilitate firing of such units, a striking element for each such lamp is held in a pre-energized position from which it is releasable to fire its lamp. A flash lamp unit of this kind and a camera mechanism for firing it is described in U.S. Pat. No. 3,576,155 issued Apr. 27, 1971, to David E. Beach.

With prior conventional electrically actuable flashcubes, cameras adapted to fire simultaneously more than one flash lamp either in the same unit or in different units have been suggested; see for example, U.S. Pat. No. 3,418,906, issued Dec. 31, 1968, to Wick et al.; German Pat. No. 1,248,459, issued Apr. 2, 1970, to Hans Peter Huber; and U.S. Pat. No. 3,404,612, issued Oct. 8, 1968, to Donald M. Harvey. Such cameras give improved results where greater illumination, wider spread illumination or a bounce flash effect is desired. However, commercial acceptance has not been notable because the special effect desired was not common enough to warrant substantial additional structure built into the camera.

SUMMARY OF THE INVENTION

It is an object of the present invention to fire simultaneously more than one mechanically actuable flash lamp.

It is another object of the invention to provide a wider angle of illumination from a multilamp unit than that ordinarily provided by the unit itself.

It is another object of the invention to accomplish the above objects with an ordinary flash camera of the type adapted to fire mechanically fireable flash lamps.

To accomplish these and other objects, the present invention provides an adapter receivable by ordinary mechanical flash cameras which adapter receives and fires a plurality of lamps in response to single flash actuation of the camera.

According to a preferred embodiment, the adapter has a socket for receiving a multilamp unit and has a single actuating member with two legs movable into actuating engagement with strikers of adjacent lamps. The adapter has a base for receipt by a camera flashcube socket with the two leg actuating member aligned with an actuating member in the camera.

Another feature of an adapter constructed according to the invention is a rotatable socket for receipt of a multilamp flash unit and means for indexing such a multilamp unit to position unfired flash lamps in each lamp firing position in response to indexing rotation of the camera socket.

The invention and its objects and advantages will become more apparent in the detailed description of the preferred embodiments presented below.

BRIEF DESCRIPTION OF THE DRAWING

In the detailed description of the preferred embodiment of the invention presented below, reference is made to the accompanying drawing which is a pictorial view of an adapter according to the invention, positioned for mounting on a percussion flash camera, with a multilamp flash unit inserted in the adapter. Portions of the camera, the multilamp flash unit, and the adapter are removed to reveal the working components of the embodiment.

DETAILED DESCRIPTION OF THE PREFERRED EMBODIMENT

Referring now to the drawing, an adapter 10 is positioned to be mounted on a percussion flash camera 12. A multiflash unit, for example, a flashcube unit 14, comprising a plurality of percussion ignitable flash lamps 80, is inserted in adapter 10. Camera 12 is of a well known type. It includes a shutter release lever 30, which is biased upwardly and movable downwardly by a shutter release mechanism (not shown), which is operable by the camera operator. A finger 32 extends upwardly from lever 30. A drive member 34 is rotatably mounted on pivot 36 and is biased in a counterclockwise direction by a spring 38. One leg 40 of drive member 34 is shown in its initial position in engagement with finger 32, so that member 34 is prevented from rotating about pivot 36. An upwardly extending arm 42 of drive member 34 terminates in a cam surface 44.

The percussion flash components of camera 12 include an actuating member or element 46, aligned with an aperture 48 in the top wall of camera 12. An ear 50 extends from the base of element 46 and is engageable by cam surface 44 of drive member 34, as drive member 34 rotates in a counterclockwise direction. A shutter 52 is rotatably mounted on a pivot 54 and is biased in a counterclockwise direction about pivot 54 by a spring (not shown). Shutter 52 has an ear 56 on a portion of the shutter extending above pivot 54. It may be seen that, upon downward movement of lever 30, drive member 34 will be freed to rotate in a counterclockwise direction under the bias of spring 38, whereupon leg 40 will contact ear 56 to rotate shutter 52 and cam surface 44 will contact ear 50 to drive percussion element 46 upwardly.

Socket 60 is located in the top wall of cameras 12 and includes a center post 62, channels 64 and resilient fingers 66 which are designed to receive multilamp flash units carrying percussive type flash lamps. Socket 60 is rotatable by 90° in response to movement of upwardly extending leg 68 of drive member 34, as drive member 34 is moved to its cocked position in response to operation of the film advance mechanism. Alternatively, camera 12 could include means for automatically rotating socket 60 with each operation of the shutter. Both such mechanisms are well known in the art.

Flashcube unit 14, also of a type well known, comprises a plurality of percussion flash lamps 80 or other lamps ignitable by striking, and a base 82 having a set of walls and recesses which mate with the corresponding center post 62, channels 64 and resilient fingers 66 in socket 60 to secure flashcube unit 14 on camera 12. For each flash lamp 80 a striker 84 is held in a preenergized position from which it is releasable to fire its respective lamp by striking. When flashcube unit 14 has been secured on cameras 12 and is in position so that a flash lamp 80 is facing in the direction of shooting, a striking element 84 is aligned over aperture 48 in camera 12. As flashcube unit 14 is indexed, a new striking element which will ignite a new forward facing flash lamp is aligned over aperture 48.

Adapter 10 comprises a support and orientation means, for example, a drive coupler 100, a drive wheel 102, drive gearing 204, a rotatable socket 104, and a flash firing or actuating member 106. Depending from the base of adapter 10 is wall 108 and a centering pin 110. Wall 108 is adapted for engaging the wall of camera 12 on which adapter 10 is mounted, while pin 110 is adapted to enter an aperture 112 in the top wall of camera 12. Either wall 108 or pin 110, or both, may be used to aid in positioning adapter 10 on the camera 12 when mounting the adapter and to prevent rotation of adapter 10 with respect to camera 12.

Drive coupler 100 extends downwardly from adapter 10 and is adapted to receive center post 62 within a recess (not shown) in its interior. Drive coupler 100 further includes walls 114 which pass into corresponding channels 64 and recesses (not shown) which are engageable by resilient fingers 66 so that adapter 10 is received by and coupled with socket 60 of camera 12. Coupler 100 will then transmit rotary movement of socket 60 to drive wheel 102. Drive wheel 102 rotates socket 104 through drive gearing 204. Socket 104 is similar to camera socket 60 and is adapted to receive a flashcube unit 14.

Adapter 10 further includes an aperture 120 which is aligned with aperture 48 in camera 12 when adapter 10 has been positioned on camera 12. Actuating member 106 includes an outwardly extending ear 122 which is accessible through aperture 120 in the base of adapter 10. Member 106 is rotatably mounted at end 126 and further includes a pair of upwardly extending portions 124. Adapter 10 further includes a spring 128 which bears against socket 104 and arrests rotation of socket 104 so that two adjacent flash lamps 80 are each directed at an angle of 45° relative to the direction of picture taking. Each one of fingers 124 on actuating member 106 will then be aligned with the striking element 84 of the flash lamps 80 which are in a firing position.

In the following explanation of the operation of the invention, it is assumed that an adapter 10 has been mounted on camera 12 as described above, with a flashcube 14 inserted into socket 104 of adapter 10 and that all components of camera 12 are cocked and an exposure is about to be made. When the shutter release lever 30 is depressed, finger 32 becomes disengaged from leg 40 of drive member 34, and member 34 rotates in a counterclockwise direction under the influence of spring 38. Substantially simultaneously, leg 40 strikes ear 56 of shutter 52, with sufficient force to cause shutter 52 to rotate in a clockwise direction against its spring bias to open the exposure aperture of camera 12. While shutter 52 is thus opening, cam surface 44 of drive member 34 engages finger 50 of element 46, thereby driving element 46 through aperture 48 of camera 12. Percussion element 46 also passes through aperture 120 of adapter 10 which is aligned with aperture 48, and then engages and forces upwards ear 122 of actuating member 106. As ear 122 is forced upwards, actuating member 106 rotates about pivot 126, thereby causing fingers 124 to move upwards and to release the striking elements 84 of the forward facing flash lamps 80, causing ignition of flash lamps 80. A maximum opening of the camera shutter 52 should be timed to correspond with the maximum output of the flash lamps 80. To complete an exposure, shutter 52 is returned to its initial position to close the exposure aperture, and shutter release lever 30 is moved upwardly to its initial position.

When the film advance mechanism of camera 12 is activated, drive member 34 is engaged and rotated in a clockwise direction against the bias of spring 38, thereby returning drive member 34 to its initial position wherein leg 40 is engaged by finger 32. Cam surface 44 is thereby moved out of engagement with ear 50 of element 46, thereby permitting element 46 to move downwardly to its initial position and freeing element 106 for rotation downwardly so that ear 122 again rests over aperture 120. As drive member 34 is rotated in a clockwise direction, upwardly extending finger 68 rotates socket 60 through an angle of 90°. Adapter wheel 102 is rotatably coupled to adapter base 100 and in turn drives socket 104 through drive gearing 204. Gearing 204 drives socket 104 through an angle of 180° in response to rotation of socket 60 through 90°, thereby presenting a new pair of flash lamps in position such that each is oriented at an angle of 45° with respect to the direction of shooting with their striking elements 84 aligned over fingers 124 of percussion element 106.

The invention has been described in detail with particular reference to the preferred embodiment thereof, but it will be understood that variations and modifications can be effected within the spirit and scope of the invention.

We claim:

1. For use with photographic apparatus having (a) means for receiving a flash unit of the type having at least one lamp ignitable by application of mechanical force and (b) means for applying a mechanical force to a received unit to actuate such a lamp, an adapter comprising:

means for receiving at least two flash lamps at operative sites;

means for simultaneously actuating ignition of at least two flash lamps received at said sites in response to application of mechanical force; and support means for attaching said adapter to photographic apparatus of the type described above, and for orienting said adapter ignition actuating means to receive mechanical force from the force applying means of the photographic apparatus.

2. An adapter according to claim 1 wherein said adapter receiving means includes means for receiving a multilamp unit containing a plurality of mechanically ignitable flash lamps which means is rotatable to simultaneously place at least two flash lamps of the multilamp unit at said operative sites.

3. An adapter according to claim 2 useable with photographic apparatus having a flash unit receiving means which is rotatable, and wherein said adapter support means includes means for coupling said receiving means of said adapter to the receiving means of the photographic apparatus and includes means for rotating said adapter receiving means in response to rotation of the apparatus receiving means to simultaneously place at least two flash lamps of said multilamp unit at operative sites.

4. For use with photographic apparatus having (a) means for receiving a percussion ignitable multilamp flash unit containing a plurality of percussion ignitable flash lamps and (b) means for actuating one of the plurality of flash lamps, an adapter for enabling such apparatus to actuate simultaneously at least two of the plurality of flash lamps, said adapter comprising:

means for receiving such a multilamp flash unit, said adapter receiving means being rotatable to simultaneously place at least two of the plurality of flash units at operative sites; and means, operatively associated with said apparatus actuating means, for simultaneously actuating percussion ignition of flash lamps located at said operative sites.

5. For use with a photographic camera having:

a flash unit socket for receiving a multilamp flash unit of the type having a plurality of lamps fireable by striking and an individual releasable pre-energized striker for each lamp, the socket being rotatable to sequentially position the lamps of such a multilamp unit at a firing site; and a camera actuating member movable from a first to a second position for releasing the striker of a lamp positioned at the firing site;

an adapter comprising:

an adapter socket for receiving such a multilamp flash unit, said adapter socket being rotatable to simultaneously position two lamps of such a multilamp unit at adapter firing sites; and two adapter actuating members each movable from first to second positions in response to movemovement of the camera actuating member between its first and second positions, to simultaneously release the strikers associated with lamps located at the firing sites.

6. An adapter according to claim 5 further comprising means for operatively connecting said adapter to the camera, said means including means interconnecting said adapter socket with the camera socket for rotation of said adapter socket through a first arc in response to rotation of the camera socket through a second arc half as large as the first arc.

7. An adapter for use with a camera having:

a flash unit socket for receiving a multilamp unit of the type having a plurality of lamps fireable by striking and an individual releasably pre-energized striker for each lamp, the socket being rotatable to sequentially position the lamps of such a multilamp unit at a camera firing site; and a camera flash actuating member movable from a first to a second position for releasing the striker of a lamp positioned at the camera firing site;

said adapter comprising:

a flash unit socket for receiving such a multilamp unit, said socket being rotatable to simultaneously position two lamps of such a multilamp unit at adapter firing sites;

two adapter flash actuating members, each movable from a first to a second position to release the striker associated with a lamp located at respective adapter firing sites;

force transmission means for receiving a single mechanical force and transmitting it simultaneously to the two adapter actuating members to simultaneously move said members from their first to their second positions; and support means for attaching said adapter to such photographic apparatus and for orienting said force transmission means to receive mechanical force from the camera flash actuating member as it moves from its first to its second position.

* * * * *